United States Patent [19]

Shaw

[11] 3,920,262
[45] Nov. 18, 1975

[54] VEHICLE STEERABLE WHEEL STABILIZER

[76] Inventor: George M. Shaw, 1500 Sylvester Road, Albany, Ga. 31705

[22] Filed: Apr. 22, 1974

[21] Appl. No.: 462,733

[52] U.S. Cl. ............................................... 280/94
[51] Int. Cl.² ........................................ B62D 7/00
[58] Field of Search ............ 280/93, 94, 503, 47.15, 280/150 A, 505; 24/243 AB, 243 G, 263 A; 267/179

[56] References Cited
UNITED STATES PATENTS

| | | | |
|---|---|---|---|
| 1,158,469 | 11/1915 | Exley et al. | 280/94 |
| 1,160,888 | 11/1915 | Havens | 280/94 |
| 1,790,216 | 1/1931 | Akins | 280/503 X |
| 3,333,863 | 8/1967 | Bishop | 267/179 X |
| 3,393,919 | 7/1968 | Ragsdale | 280/94 |

Primary Examiner—Leo Friaglia
Assistant Examiner—R. Schrecengost
Attorney, Agent, or Firm—Jones, Thomas & Askew

[57] ABSTRACT

Tension spring assemblies are suspended between the steerable wheel assemblies of a heavy vehicle and the frame of the vehicle for the purpose of urging the lower portions of the steerable wheels inwardly beneath the vehicle. Each spring assembly includes one or more coil springs and a clamp connected to the lower enlargement of an I-shaped frame member of the vehicle frame. The clamp is connectable to the I-shaped frame member without cutting or otherwise altering the configuration of the frame member.

2 Claims, 4 Drawing Figures

VEHICLE STEERABLE WHEEL STABILIZER

BACKGROUND OF THE INVENTION

Wheels stabilizers for the steerable wheels of heavy vehicles have been used in the past for the purpose of reducing wear on bearings and other parts of the steerable wheel assemblies of vehicles and for providing steering control to the driver of the vehicle. The wheel stabilizers extend between the frame of the vehicle and the lower portion of the nonrotatable elements of the pivotal wheel assemblies and urge the wheel assemblies inwardly beneath the vehicle. This tends to reduce the tendency of the wheels to bow outwardly under the weight of the vehicle and tends to pull the wheels back towards their centered or straight ahead directions when the steering wheel of the vehicle is released. Some examples of prior art wheel stabilizers are set forth in U.S. Pat. Nos. 3,333,863, 3,393,919, and 3,448,991.

While the prior art wheel stabilizers have been somewhat effective in reducing wear and the resulting undesirable wear symptoms in the steerable wheel assemblies of heavy vehicles, it has been difficult to connect the stabilizers to the wheels of the vehicle and to the frame of the vehicle. It should be understood that it is desirable not to cut or otherwise alter the frame or wheel assembly of a vehicle when mounting a stabilizer on the vehicle. Any cutting of or alteration of the parts of a vehicle might possibly weaken the vehicle, or if not actually weakening the vehicle, the potential purchaser of such a stabilizer is likely to believe that the alteration of the vehicle to accommodate the stabilizer would cause the components of the vehicle to be weakened. While some of the prior art devices are connectable to the vehicle without substantial alteration of the parts of the vehicle, the clamps and other connecting elements of the prior art are relatively inconvenient to handle and mount on the vehicle, and once mounted on the vehicle, the clamps are bulky and sometimes unreliable.

SUMMARY OF THE INVENTION

Briefly described, the present invention comprises wheel stabilizers for the steerable wheels of heavy vehicles, such as trucks, wherein tension spring assemblies are suspended between the lower portion of steerable wheel assemblies and the frame of the vehicle to urge the lower portions of the wheels inwardly beneath the vehicle to counteract the tendency of the wheel to bow outwardly under the weight of the vehicle. Each spring assembly includes a clamp which is connectable to the I-shaped frame of the vehicle. The clamp draws together about the enlarged lower portion of the I-shaped frame member and provides a relatively streamlined and secure connection. The clamp includes a lower base plate positionable beneath the frame member and a pair of L-shaped clamp elements each including a leg extending upwardly from the base plate and a lateral leg extending over the enlarged lower portion of the I-shaped frame member. When the clamp elements are drawn toward the base plate, the upwardly extending legs of the clamp elements bear against the base plate while the laterally extending legs pivot toward clamping engagement with the enlarged lower portion of the I-shaped frame member. When the clamp is being connected to the frame member, the clamp is loosened and is inserted about the lower enlarged portion of the I-shaped frame member and then tightened to create a reliable connection.

Thus, it is an object of the present invention to provide a wheel stabilizer which is inexpensive to construct, easy to install and which does not require alteration of the vehicle frame.

Other objects, features and advantages of the present invention will become apparent upon reading the following specification, when taken in conjunction with the accompanying drawing.

DESCRIPTION OF A DISCLOSED EMBODIMENT

Figure 1:
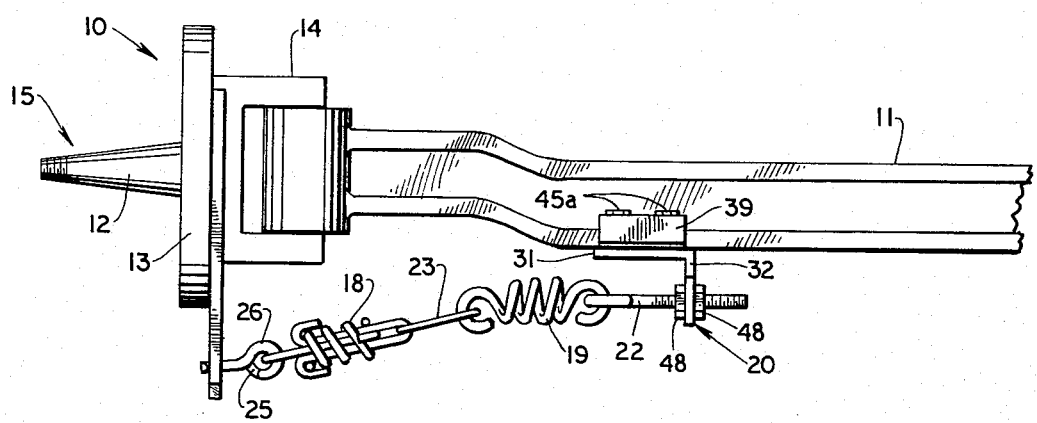
FIG. 1 is a partial front view of a beam-type front axle of a motor vehicle and a portion of the steerable wheel assembly, with the wheel stabilizer installed.

Referring now in more detail to the drawing, in which like numerals indicate like parts throughout the several views, FIG. 1 illustrates a portion of a steerable vehicle suspension system 10 wherein an I-beam front axle 11 functions as a frame member in the vehicle frame, and the spindle 12 is mounted on the axle and forms a part of the steerable wheel assembly 15. It will be understood that a rotatable wheel is mounted on spindle 12 and together with the other wheels of the vehicle, the wheel assembly 15 functions to support and guide the vehicle. The wheel assembly is illustrated as being of the type without brakes, as is common with heavy trucks, and only one wheel assembly is illustrated, it being understood that another steerable wheel assembly is mounted on the opposite end of front axle 11. Backing plate 13 extends radially outwardly from the base of spindle 12, and steering knuckle 14 is formed between the wheel assembly and the front axle to pivot the wheel assembly about an upwardly extending axis with respect to axle 11.

Wheel stabilizer 16 is suspended between the I-shaped frame member 11 and the pivotal wheel assembly 15. Wheel stabilizer 16 comprises a tension spring assembly and includes one or more springs 18, spring 19, clamp 20 and connecting plates 21. Springs 18 are illustrated as being coil compression spring and spring 19 is illustrated as being a coil tension spring. Two of the springs 18 can be used as illustrated in the drawing. Springs 18 are connected end-to-end in series with spring 19 between clamp 20 and connecting plates 21. The springs may be either tension or compression springs; however, the net effect of springs 18 and 19 is to apply tension between clamp 20 and connecting plates 21. Eye bolt 22 connects spring 19 to clamp 20, and ring 23 connects spring 19 to springs 18.

Figure 2:
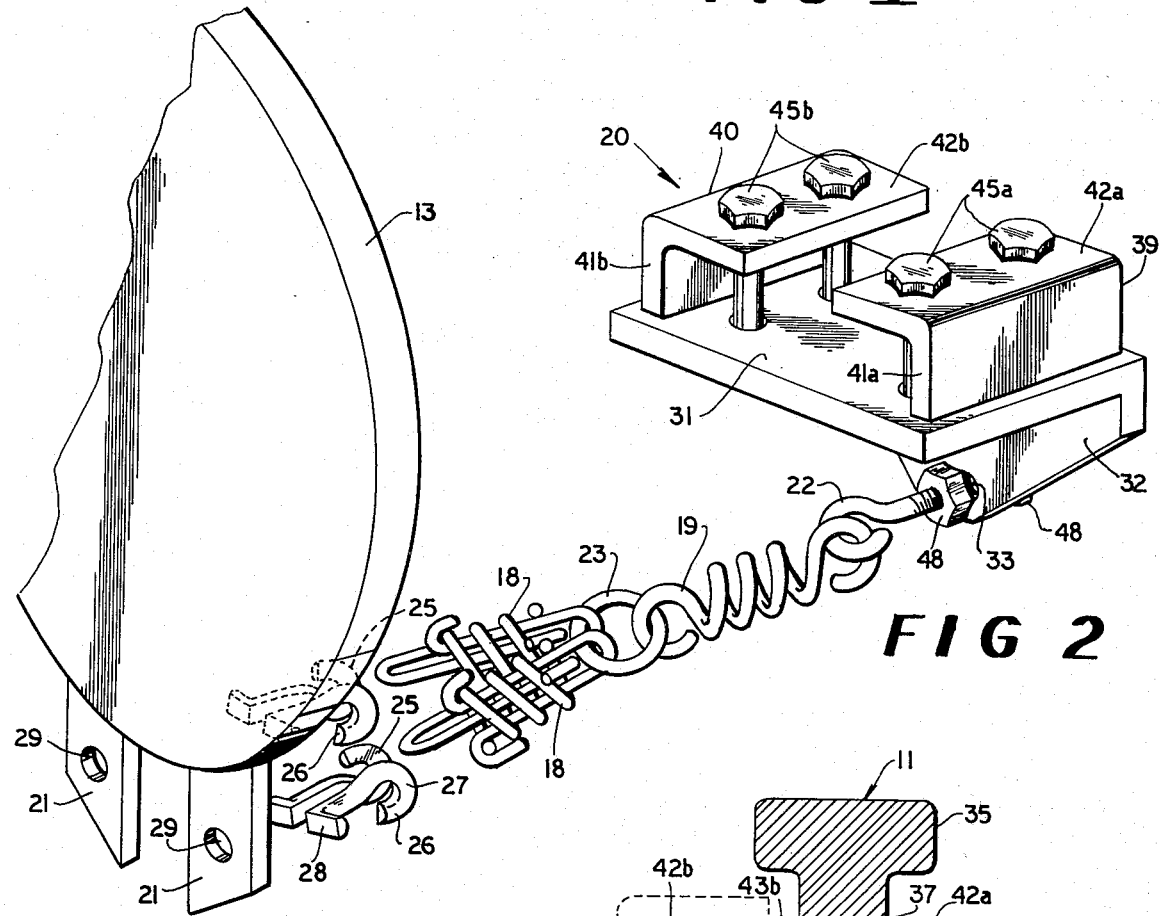
FIG. 2 is a perspective exploded view of the clamp of the wheel stabilizer, the wheel spindle, the connecting plate and connecting hooks.

Pairs of similar mating hooks 25 and 26 connect springs 18 to connecting plates 21. As best illustrated in FIG. 2, the mating hooks 25 and 26 are both formed from hemi-cylindrical stock with their flat surfaces normally in abutting relationship. The curved bends 27 overlap each other and together form the eye of a hook and eye, while the outwardly turned bends 28 function as anchors in connecting plate 21. Opening 29 in connecting plate 21 receives the anchors of mating hooks 25 and 26. Connecting plates 21 are bolted or otherwise attached to backing plate 13 of pivotal wheel assembly 15.

Clamp 20 comprises a base plate 31 which is substantially flat and includes a downwardly turned tab 32. Tab 32 is beveled inwardly toward its lower portion and defines opening 33 therethrough. Base plate 31 is wider than the width of the I-shaped frame member 11. Frame member 11 includes upper and lower enlargements 35 and 36 which are interconnected along their lengths by central web 37. Base plate 31 is placed in abutment with the lower surface of lower enlargement 36 of frame member 11.

Clamp elements 39 and 40 are mounted on base plate 31, on opposite sides of frame member 11. Clamp elements 39 and 40 each include upwardly extending legs 41a and 41b and lateral legs 42a and 42b. Lateral legs 42a and 42b each include a pair of openings 43a and 43b, and base plate 31 also defines a pair of openings 44a and 44b on opposite sides of frame member 11. Bolts 45a and 45b extend through the openings of clamp elements 39 and 40 and through the openings of base plate 31. Nuts and locking washers are threaded on the bolts.

When clamp 20 is mounted on frame 11, the nut will be backed off the bolts so as to loosen clamp elements 39 and 40. The mechanic wedges the clamp 20 about the lower enlargement 36 of the I-shaped frame element 11 until the lateral legs 42a and 42b of the clamp elements extend over the lower enlargement 36 of the frame member. The nuts are then tightened on their bolts so as to draw the lateral legs 42a and 42b toward base plate 31. As the clamp elements 39 and 40 are tightened on the base plate, the upwardly extending legs 41a and 41b are urged against base plate 31 and tend to slide or pivot outwardly across the surface of base plate 31 and the lateral legs 42a and 42b are moved down towards engagement with the enlargement of the frame member. When base plate 31 is drawn up tightly against the bottom surface of the frame member, the lower edges of upwardly extending legs 39 and 40 will bear against the upper surface of base plate 31 while the inner edges of lateral legs 42a and 42b will bear downwardly against the upper surfaces of the lower protrusion 36 of the frame member. Also, clamp elements 39 and 40 will have pivoted inwardly closer to the central web portion 37 of the I-shaped frame member 11. Thus, the line of contact between the lower edge of the upwardly extending legs 41a and 41b with the upper surface of base plate 31 forms a fulcrum for the clamp elements in a lever action to cause the inner ends of the lateral legs 42a and 42b to pivot inwardly into grasping relationship with respect to the lower enlargement 36 of the I-shaped frame member 11.

Eyebolt 22 of the compound spring assembly is inserted through the opening 33 of clamp 20, and the nuts 48 are threaded on the threads of the link on opposite sides of tab 32 of the clamp to securely hold the link in place. When the wheel stabilizer is first being installed, the nuts 48 will be backed off link 22 so that the elements can be fastened to the vehicle while not under tension, and the nuts 48 can then be tightened to apply the proper tension between the frame and the pivotal wheel assembly.

The compound spring arrangement is similar to the type illustrated in U.S. Pat. No. 3,333,863, in that it includes weak springs 18 and a strong spring 19. The weak springs 18 are coil compression springs and are compressed first upon the application of force to the wheel stabilizer, and their limiting means limits the distance that they can stretch so that the application of more force to the wheel stabilizer causes stronger coil tension spring 19 to begin to open.

Figure 4:
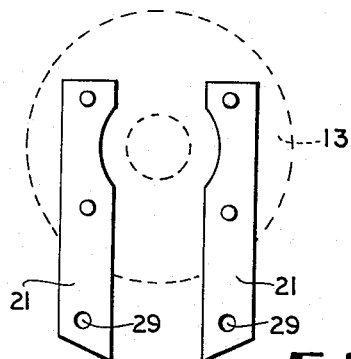
FIG. 4 is a front view of the connecting plates with the wheel backing plate shown in dashed lines.
Figure 3:
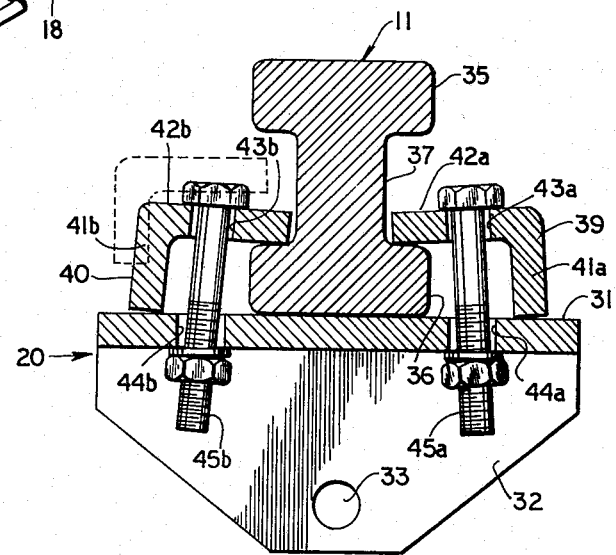
FIG. 3 is a sectional end view of the front axle of FIG. 1 and the clamp mounted on the axle.

Connecting plates 21 are illustrated in FIG. 4 and are bolted or otherwise connected to backing plate 13 so that the lower distal ends project to a level below the axle of the vehicle to suspend the wheel stabilizers below the axle. The number of holes in the connecting plates and the size and shape of the connecting plates may vary to suit the particular vehicle.

While clamp 20 has been illustrated as being connectable to a frame member 11 of I-shaped cross section, it will be understood by those skilled in the art that the clamp can be connectable to a frame member having a modified cross sectional configuration, as long as an enlargement of the type illustrated at 36 is present so that the clamp elements 39 and 40 can grasp the frame member. Thus, the description of the frame member as being of approximately I-shaped cross sectional shape is intended to cover other and equivalent shapes.

While this invention has been described in detail with particular reference to a preferred embodiment thereof, it will be understood that variations and modifications can be effected within the spirit and scope of the invention as described hereinbefore and as defined in the appended claims.

I claim:

1. In a steerable vehicle suspension system of the type including at least one rotatable wheel mounted on a spindle and pivotal about a generally upright axis, the vehicle including a frame with a frame member of approximately I-shaped cross sectional shape and including a vertical web and an enlarged lower portion extending toward the wheel, the combination therewith of a tension spring assembly connected at one of its ends to the wheel spindle and at its other end to said frame member and including a clamp comprising a base plate positionable beneath the frame member and of a width wider than the frame member and a pair of L-shaped clamp elements each including an upwardly extending leg braced at its lower end against said base plate and extending upwardly from said base plate and a lateral leg projecting from the upper end of said upwardly extending leg and projecting laterally inwardly over the enlarged lower portion of said frame member and toward the vertical web of said frame member, said base plate defining openings therethrough at opposite sides thereof spaced apart a distance further than the width of the enlarged lower portion of said frame member, and the lateral leg of each of said clamp elements defining openings therethrough, and bolts extending through the openings in said base plate and the openings of the lateral leg of said clamp elements for drawing the lateral leg of said clamp elements against the enlarged lower portion of said frame member and tightening said clamp on said frame member.

2. The invention set forth in claim 1 and wherein said base plate includes a downwardly turned tab and an opening is defined in said tab, and wherein said tension spring assembly includes at least one coil spring suspended at one end from said tab.

* * * * *